United States Patent [19]

Tanaka

[11] Patent Number: 5,479,533
[45] Date of Patent: Dec. 26, 1995

[54] PATTERN RECOGNITION APPARATUS AND METHOD USING FUZZY LOGIC

[75] Inventor: Masato Tanaka, Kanagawa, Japan

[73] Assignee: Yamatake-Honeywell Co., Ltd., Tokyo, Japan

[21] Appl. No.: 223,139

[22] Filed: Apr. 5, 1994

Related U.S. Application Data

[63] Continuation of Ser. No. 843,988, Feb. 28, 1992, abandoned.

[51] Int. Cl.$^6$ ................................................ G06K 9/62
[52] U.S. Cl. ................................... 382/161; 382/203
[58] Field of Search ................................ 382/13, 14, 15, 382/30, 161, 203, 218

[56] References Cited

U.S. PATENT DOCUMENTS

| | | | |
|---|---|---|---|
| 4,177,448 | 12/1979 | Brayton | 382/14 |
| 4,805,224 | 2/1989 | Koezuka et al. | 382/14 |
| 5,121,441 | 6/1992 | Chefalas et al. | 382/13 |
| 5,150,425 | 9/1992 | Martin et al. | 382/14 |
| 5,222,155 | 6/1993 | Delanoy et al. | 382/30 |

OTHER PUBLICATIONS

Takata, K. "Signature Identification System Using a Fuzzy Template" Nov. 1991 abstract.
Shichang, Wu "A fuzzy pattern recognition method of hand printed characters" 1986 abstract.

Primary Examiner—Leo H. Boudreau
Assistant Examiner—Christopher Kelley
Attorney, Agent, or Firm—Lane, Aitken & McCann

[57] ABSTRACT

Pattern recognition method and apparatus are provided which can recognize not only standard typewritten characters but also handwritten characters and various styles of fonts without the necessity of learning, formation of rules, and complicated algorithm for extracting characteristics of patterns which have been required to conventional pattern recognition apparatus. A signal representing a pattern to be recognized is inputted and converted into binary signals corresponding to the pattern. The binary signals are compared with predetermined reference patterns having indefinite boundaries. The reference patterns each are formed based on one or more multi-dimensional membership functions. A certainty factor of the pattern recognition is calculated from the comparison as the pattern recognition result.

5 Claims, 9 Drawing Sheets

FIG.6A INPUTTED IMAGE

FIG.6B BINARY CONVERSION n=35

MATCHING ($T_1 = 28$)

FIG.6C

——— DEGREE = 1
- - - DEGREE = 0

MATCHING ($T_2 = 38$)

FIG.6D n=40

INPUTTED IMAGE

BINARY CONVERSION

MATCHING
($T_1$=30)

— DEGREE = 1
--- DEGREE = 0

FIG.7C

MATCHING
($T_2$=38)

PATTERN RECOGNITION APPARATUS AND METHOD USING FUZZY LOGIC

This is a continuation of application Ser. No. 07/843,988 filed Feb. 28, 1992, now abandoned.

BACKGROUND OF THE INVENTION

1. Field of the Invention

The present invention relates to a pattern recognition using a so-called fuzzy logic, and more particularly to a method of recognizing patterns which are not uniformly defined such as handwritten characters, by evaluating such characters with reference patterns having fuzzy contours and an apparatus for implementing the method.

2. Description of the Prior Art

Many pattern recognition techniques are known in the art which use image processing but which are, however, generally intended to recognize a uniformly defined pattern such as a typeface and are not capable of recognizing handwritten characters which are not strictly defined. For recognizing such handwritten characters, there are methods using artificial intelligence, wherein a neural network is formed by initially learning characteristics of patterns of respective characters to be recognized. Patterns or characters, desired to be recognized, are inputted thereto for recognition, characteristics of the patterns are extracted and stored and compared with subsequently input patterns to achieve recognition of the identity of the patterns.

The recognition method using a neural network, useful in recognizing handwritten characters as mentioned above, however, requires learning which must be redone every time a pattern to be recognized is newly added to the existing neural network. Specifically, even with a slight change in a single pattern to be recognized, the neural network, in many cases, must learn again all of the previously learned patterns (training data). Further, the user is not aware how the recognition result is derived by the neural network, which results in difficulties in maintenance of the neural network.

In recent years, fuzzy logic has been applied to neural networks and pattern recognition, in particular, where a pattern to be recognized is checked with each of a plurality of stored data related to characteristics of patterns possessed by a system.

Conventional recognition methods using fuzzy logic, however, require a procedure of acquiring an immense amount of knowledge related to characteristics of respective objective patterns, referred to as a rule, as well as an algorithm for extracting characteristics of respective patterns for building a system including software, whereby many rules and membership functions for fuzzy sets are required. This results in complicated processing, long learning times and much computing overhead during the recognition process.

SUMMARY OF THE INVENTION

In view of the problems mentioned above, it is an object of the present invention to provide a pattern recognition method using the fuzzy logic which is capable of efficiently and accurately recognizing patterns without the necessity of learning, formation of rules and complicated algorithm for extracting characteristics of patterns.

According to a first aspect of the present invention there is provided a pattern recognition method comprising the steps of:

inputting a signal representing a pattern to be recognized;

converting the signal into binary signals corresponding to the pattern;

comparing the binary signals with predetermined reference patterns having indefinite boundaries, the reference patterns each formed based on one or more multi-dimensional membership functions; and calculating a certainty factor of the pattern recognition from the comparison results.

According to a second aspect of the present invention there is provided a pattern recognition apparatus comprising:

first input means for receiving a signal representing a pattern to be recognized;

second input means for receiving parameters for setting a fuzzy template;

multi-dimensional membership function generating means coupled to receive the parameters of generating one or more multi-dimensional membership functions for forming reference patterns for recognition;

calculating means coupled to receive the inputted signal and the reference patterns for calculating matching degrees between the inputted signal and each reference pattern;

comparing means coupled to receive the matching degrees for comparing them with one another to select the highest matching degree; and outputting means coupled to the comparing means for outputting the highest matching degree as the pattern recognition results.

The above and other objects, features and advantages of the present invention will become apparent from the following detailed description of the preferred embodiment with reference to the accompanying drawings.

DETAILED DESCRIPTION OF A PREFERRED EMBODIMENT OF THE INVENTION

In copending U.S. patent application Ser. No. 07/843,751, entitled FUZZY DATA PROCESSING METHOD AND DATA SMOOTHING FILTER, by Masato Tanaka (the inventor of the present invention), concurrently filed herewith and assigned to the assignee of the present invention and which is hereby fully incorporated by reference, the concept of approximating a line segment with a fuzzy shape such as an ellipse was exploited by developing a three-dimensional membership function expressive of degrees of membership of locations in a two-dimensional plane of data points in an ideal line expressed by the membership function. As disclosed therein, the membership function could be moved and rotated to determine the location and angle of a line best approximating an array of data points. By repeating this analysis on a moving array of data points, line smoothing could be obtained.

The technique disclosed therein used the computation of the degree of membership of each data point to assign different weights to the position of each data point in order to permit effective exclusion of extraordinary data points and allow a single methodology to be used to remove noise from data even though the noise might have differing statistical properties. By so doing, the smoothing filter was made able to effectively mimic human subjective judgment of the best fit of a curve (comprised of straight line segments) through an array of data points.

With regard to the present invention, at a most basic level, it has been found by the inventor that the principle of the above incorporated invention can also be applied to other, more complex geometric shapes. That is, in the above-incorporated invention, a line segment was approximated by an ellipse having a major axis coincident with the line segment and the membership function was chosen to have orthogonal cross-sections which were preferably Gaussian and contours representing equal degrees of membership which were elliptical. As the process was repeated for moving arrays (e.g. data points 1–5, 2–6, 3–7, etc.) the effective composite membership function corresponding to the smoothed curve ultimately obtained takes the form of a three-dimensional Gaussian distribution centered on the smoothed curve much in the shape of a ridge or wrinkle in a surface. Therefore, in accordance with the present invention, membership functions having chosen statistical distributions about curves which may be either open or closed are used as patterned membership functions with indefinite boundaries for the evaluation of patterns.

Figure 4:
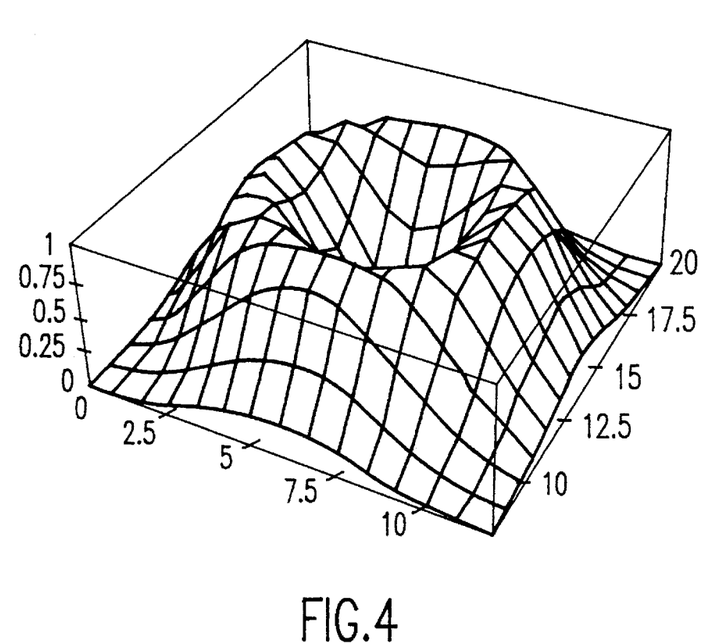
FIGS. 4 and 5 are graphs illustrating the shapes of three-dimensional membership functions employed in an embodiment of the invention.
Figure 5:
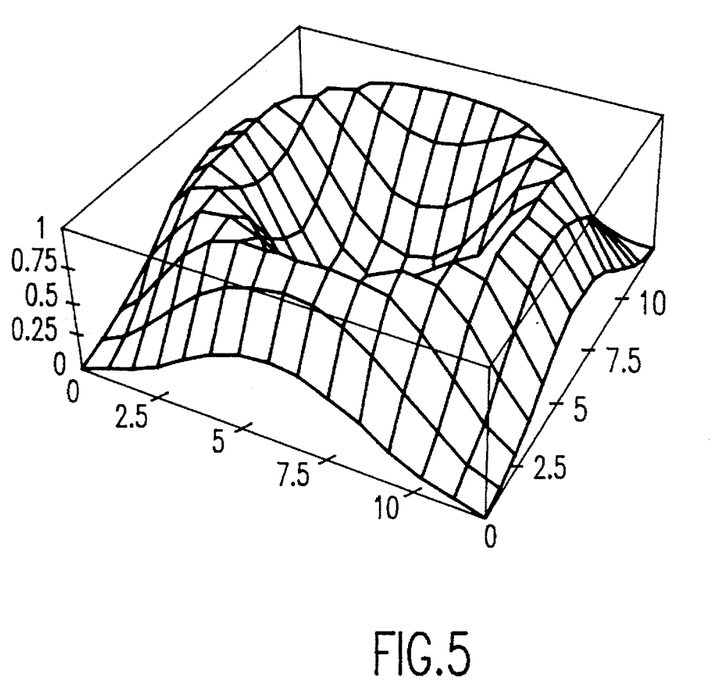

To assist in the visualization of the operation of the present invention, FIGS. 4 and 5 show membership functions corresponding to circular closed curves. These membership functions could be considered as surfaces which would result from the passing the axis (or maximum) of an arbitrary statistical distribution curve along an ideal curve. The definition of the shape as represented by the membership function of FIG. 4 or 5 is thus a fuzzy definition of the closed circular curve.

With the above as basic introduction and prior to describing an embodiment of the invention, the principle of pattern recognition according to the invention will be first explained.

Figure 1:
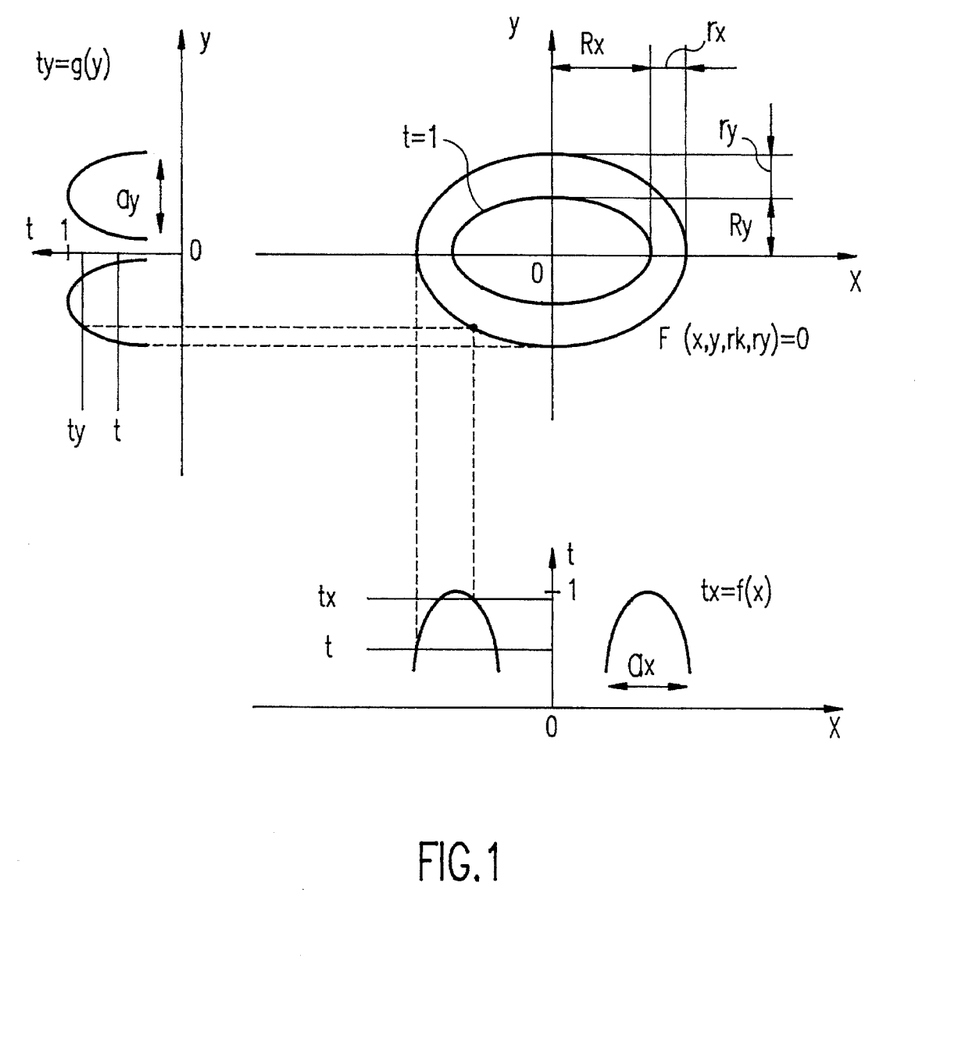
FIG. 1 is a graph illustrating an example of a three-dimensional membership function employed in the present invention.

First, one or more three-dimensional membership functions are combined corresponding to a pattern to be recognized. For example, as shown in FIG. 1, a three-dimensional membership function having an elliptic contour is set in a three-dimensional domain formed by x-y orthogonal coordinates and the degree of membership. Reference letters in FIG. 1 are defined as follows:

$F(x, y, rx, ry)$: a function providing an elliptic contour $tx=f(x)$: a cross-sectional view of a Gaussian-type membership function on the x-tx plane $ty=g(y)$: a cross-sectional view of the Gaussian-type membership function on the y-ty plane $Rx$: the x-direction diameter of the elliptic contour at the degree of membership equal to 1

$Ry$: the y-direction diameter of the elliptic contour at the degree of membership equal to 1

$ax$: a parameter proportional to a fuzzy entropy in the x-direction $ay$: a parameter proportional to a fuzzy entropy in the y-direction $rx$: the distance between an arbitrary contour including an arbitrary point $(x, y)$ having a degree of membership $t<1$ and the contour at the degree of membership=1 on the x-tx plane $ry$: the distance between an arbitrary contour including the arbitrary point $(x, y)$ having a degree of membership $t<1$ and the contour at the degree of membership=1 on the y-ty plane $t$: the degree of membership at a point $(x, y)$ given by the three-dimensional membership function It is supposed that the origin is designated as a reference point (a central point for most easily describing the three-dimensional membership function) for the sake of simplicity.

A contour including an arbitrary point $(x, y)$ is expressed by the following equation:

$$\frac{x^2}{(R_x+r_x)^2} + \frac{y^2}{(R_y+r_y)^2} - 1 = 0 \qquad (1)$$

$t_x$, $t_y$ are expressed by the following equations (2), (3):

In the above equations, the symbol "−" in $(x \mp R_x)^2$ and $(y \mp R_y)^2$ represents a positive domain of x $$t_x = f(x) = \exp\left[ -\frac{(x \mp R_x)^2}{a_x^2} \right] \qquad (2)$$

$$t_y = g(y) = \exp\left[ -\frac{(y \mp R_y)^2}{a_y^2} \right] \ldots (3) \qquad (3)$$

and y, while the symbol "+" a negative domain of the same. On the x-$t_x$ plane and the y-$t_y$ plane the distance between a contour of interest and the reference point is $R_x+r_x$ and $R_y+r_y$, respectively, so that $r_x$ and $r_y$ are derived by:

$$t = \exp\left[ -\frac{\{\pm(R_x+r_x) \mp R_x\}^2}{a_x^2} \right] = \exp\left[ -\frac{r_x^2}{a_x^2} \right] \qquad (4)$$

$$r_x = a_x \sqrt{-\ln t}$$

$$t = \exp\left[ -\frac{\{\pm(R_y+r_y) \mp R_y\}^2}{a_y^2} \right] = \exp\left[ -\frac{r_y^2}{a_y^2} \right] \qquad (5)$$

$$r_y = a_y \sqrt{-\ln t}$$

Therefore, substituting the equations (4), (5) for the equation (1):

$$\frac{x^2}{(R_x + a_x \sqrt{-\ln t})^2} + \frac{y^2}{(R_y + a_y \sqrt{-\ln t})^2} - 1 = 0 \quad (6)$$

$$\frac{x^2/a_x^2}{(R_x/a_x + a_x \sqrt{-\ln t})^2} +$$

$$\frac{y^2/a_y^2}{(R_y/a_y + a_y \sqrt{-\ln t})^2} - 1 = 0$$

The equation (6) cannot be readily transformed to an explicit function with respect to t unless the elements in parenthesis of the denominators of the first and second terms are in the same form. Therefore, $$\min(R_x/a_x, R_y/a_y) = S_k \quad (7)$$

is calculated, a proper value is selected for s from a range of $0 < s < s_k$, and $d_x$, $d_y$ satisfying the following equation (8) are calculated:

$$\frac{R_x - d_x}{a_x} = \frac{R_y - d_y}{a_y} = s \quad (8)$$

where s is a parameter for adjusting the contour representing the degree of membership equal to one of a fuzzy set.

That is, $d_x = R_x - a_x s$ ... (9) and $d_y = R_y - a_y s$ ... (10) are calculated, and with these equations the above equation (6) is transformed as follows (see FIG. 2):

$$\frac{(x \mp d_x)^2/a_x^2}{\{(R_x - d_x)/a_x + \sqrt{-\ln t}\}^2} + \quad (11)$$

$$\frac{(y \mp d_y)^2/a_y^2}{\{(R_y - d_y)/a_y + \sqrt{-\ln t}\}^2} - 1 = 0$$

In the above equation (10), the symbol "−" in $(x \mp d_x)^2$ and $(y \mp d_y)^2$ represents a positive domain of x and y, while the symbol "+" represents a negative domain of the same.

Then, the equation (11) is transformed as the following equation (12):

$$\frac{(|x| - d_x)^2/a_x^2}{(s + \sqrt{-\ln t})^2} + \frac{(|y| - d_y)^2/a_y^2}{(s + \sqrt{-\ln t})^2} - 1 = 0 \quad (12)$$

Figure 2:
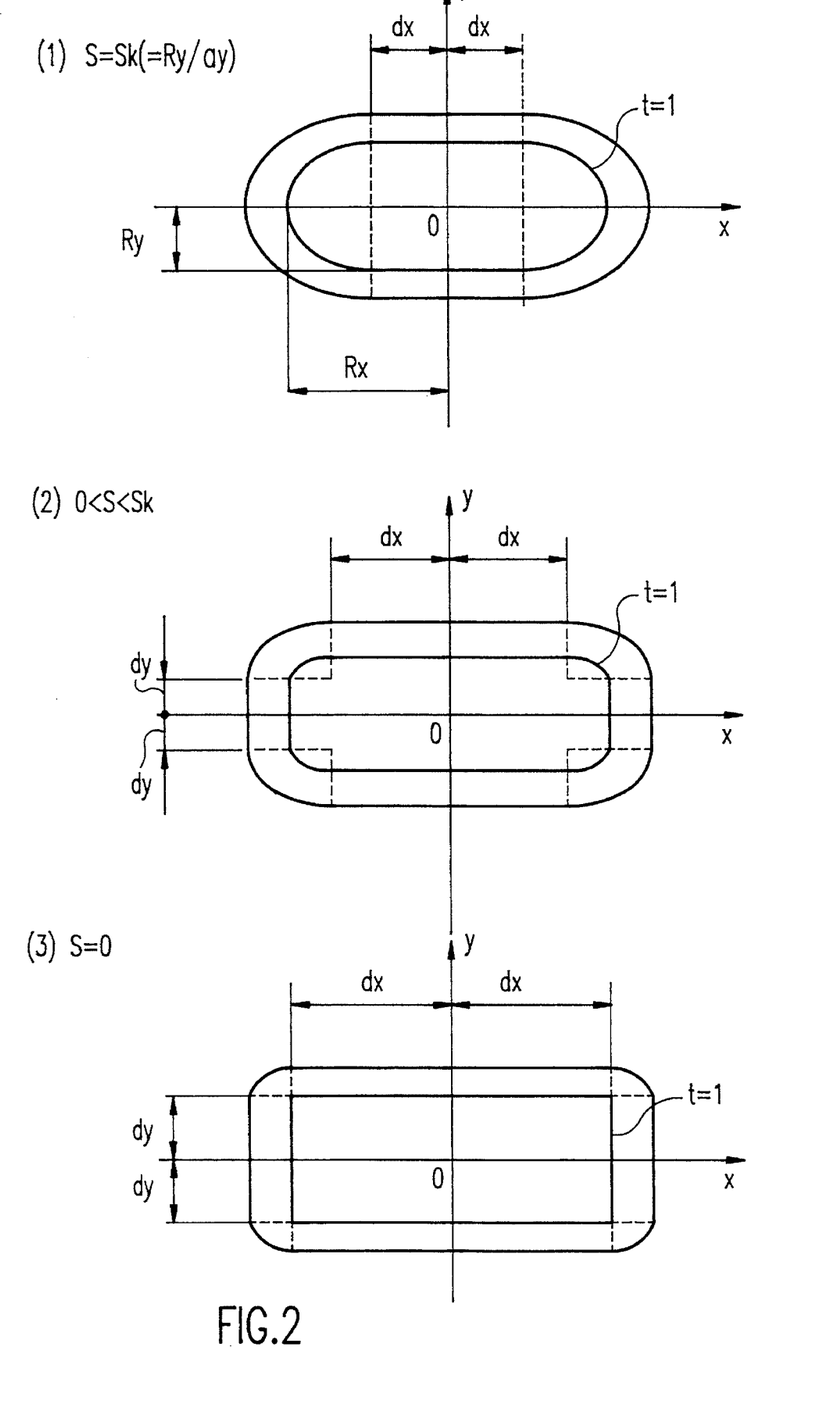
FIG. 2 is a graph illustrating a modification of the three-dimensional membership function of FIG. 1.

The equation (12) represents figures as shown in FIGS. 2 (1)–(3). From the equation (12):

$$s + \sqrt{-\ln t} = \sqrt{\frac{(|x| - d_x)^2}{a_x^2} + \frac{(|y| - d_y)^2}{a_y^2}} \quad (13)$$

$$s + \sqrt{-\ln t} > 0$$

$$t = \exp\left[-\left\{\sqrt{\frac{(|x| - d_x)^2}{a_x^2} + \frac{(|y| - d_y)^2}{a_y^2}} - s\right\}^2\right] \quad (14)$$

It should be noted that when $|x| < d_x$, the above equation (14) is calculated with $x = d_x$, and when $|y| < d_y$, the equation (14) is calculated with $y = d_y$. This corresponds to straight line portions in FIGS. 2 (2) and (3). For a contour outside the ellipse at the degree of membership equal to 1, the term in braces is positive.

Figure 3A:
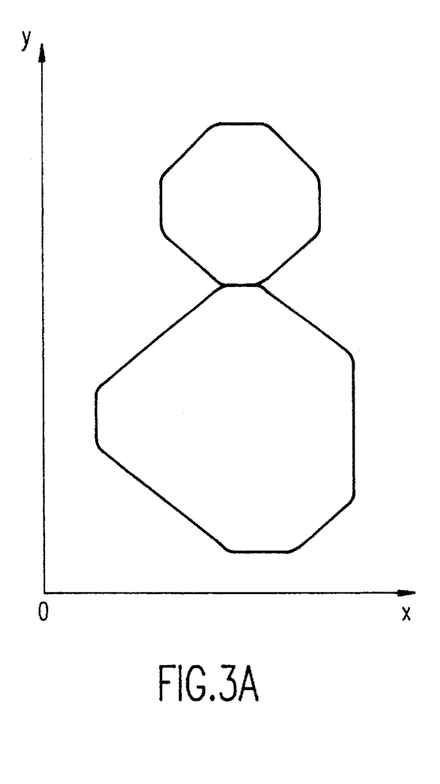
FIGS. 3(a) and 3(b) are diagrams illustrating an example of a pattern to be recognized and binary signals corresponding to the pattern, respectively.

The above processes will be specifically explained, giving an example of setting a three-dimensional membership function for recognizing a figure like "8" as shown in FIG. 3(a). In the following explanation, the range of the degree of membership is extended from [0, 1] to [−1, 1] in order to give a negative evaluation value to an improper input.

1. A three-dimensional membership function whose degree of membership equal to 1 is represented by a circle having a radius of 3.5 with the center thereof located at (6, 14) is selected. When the range of the degree of membership is extended to [−1, 1] (FIG. 4):

$$t_1 = 2\exp\left[-\left\{\sqrt{\frac{(x-6)^2}{2^2} + \frac{(y-14)^2}{2^2}} - \frac{3.5}{2}\right\}^2\right] - 1 \quad (15)$$

2. A three-dimensional membership function whose degree of membership equal to 1 is represented by a circle having a radius of 4.5 with the center thereof located at (6, 6) is selected. When the range of the degree of membership is extended to [−1, 1] (FIG. 5):

$$t_2 = 2\exp\left[-\left\{\sqrt{\frac{(x-6)^2}{2^2} + \frac{(y-6)^2}{2^2}} - \frac{4.5}{2}\right\}^2\right] - 1 \quad (16)$$

Figures 6A, 6B, 6C:
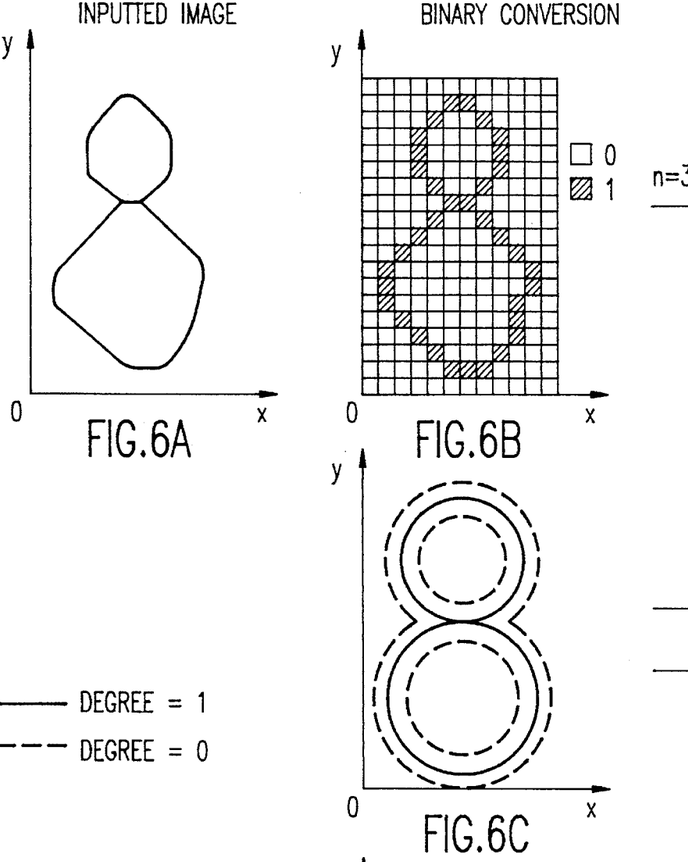
FIGS. 6(a)–6(d) are diagrams illustrating a pattern recognition procedure according to the invention.

A three-dimensional function formed by a combination of the above two three-dimensional elliptic membership functions, as shown in FIG. 6(c), is designated as a fuzzy template for the inputted figure to be recognized (FIGS. 3a and 6a).

$$t = \max(t_1, t_2) \quad (17)$$

Next, the inputted video signal is converted into a binary signal, with corrections if necessary.

Figure 3B:
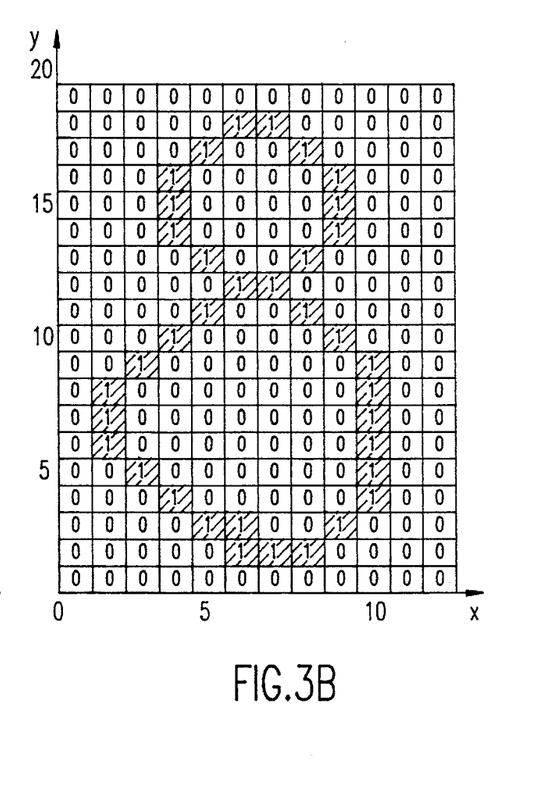

Referring to FIGS. 3(a) and 3(b), the region including the figure "8" is divided, for example, into 12 in the x-direction and 19 in the y-direction. Each divided area or cellule is set to 0 or 1 corresponding to the inputted figure. In this example, 35 out of 228 cellules are set to 1 (black), as shown in FIG. 6(b).

Then, the sum $T_1$ of the degrees of membership at black cellules and a mean degree of membership $S_1$ $(=T_1/n)$ are calculated by the membership function t set for the recognition of this example.

In this example, the sum $T_1$ of the degrees of membership is 28, and the mean value S1 is 28/35= 0.8.

Figure 6D:
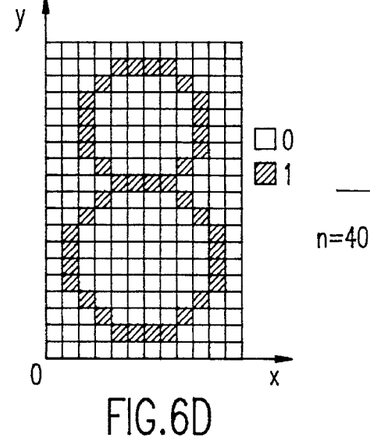

Next, the sum $T_2$ of degrees of membership and a mean degree $S_2$ of membership are calculated for an ideal shape (t=1). With an ideal shape of "8", as shown in FIGS. 6(c) and 6(d), the value $T_2$ for 40 black cellules is 38, and the mean value $S_2$ is 38/40=0.95.

Next, the certainty factor is calculated by adding the ratio of the degrees of membership of the inputted pattern and the ideal shape and the ratio of the mean degrees of membership of the same and dividing the sum by 2:

$$\left( \frac{28}{38} + \frac{0.8}{0.95} \right) \div 2 = 0.79$$

The ratio $T_1/T_2$ may sometimes exceed 1, in which case the ratio is assumed to be 1, i.e., $\min(T_1/T_2, 1)$.

Figures 7A, 7B, 7C:
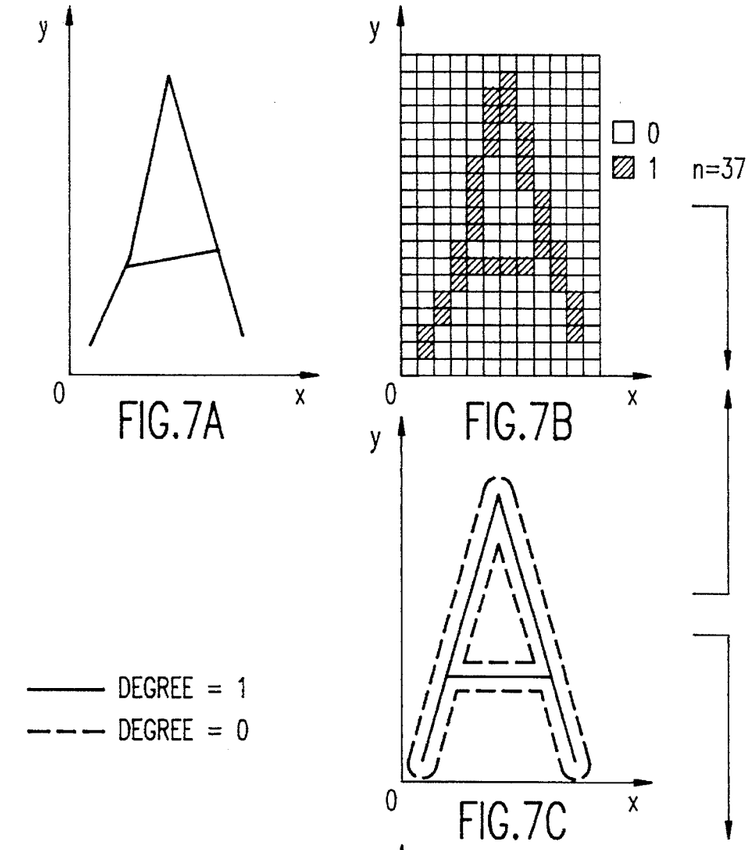
FIGS. 7(a)–7(d) are diagrams illustrating a procedure for recognizing another pattern.

A second example of recognizing a pattern like "A" as shown in FIG. 7(a) will hereinafter be described.

First, as shown in FIG. 7(c), three three-dimensional membership functions are combined to form a fuzzy template for the pattern "A". With the pattern of FIG. 7(a), 37 cellules out of the whole region comprising 228 cellules are given a binary "1" (black).

Then, for the fuzzy template established for the pattern, the sum $T_1$ of the degree of membership of 37 black cellules and a mean degree of membership $S_1(=T_1/n)$ are calculated. In this example, the sum $T_1$ of the degrees of membership of the 37 black cellules is 30, and the mean degree of membership $S_1$ is 30/37=0.81.

Figure 7D:
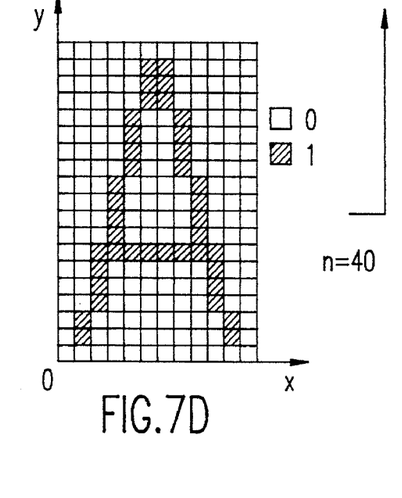

An ideal shape for the character "A", as shown in FIGS. 7(c) and 7(d), has 40 black cellules, so that the sum $T_2$ of the degrees of membership of the 40 black cellules is 38 and a mean degree $S2$ of membership is 38/40=0.95.

From the above results, the certainty factor is calculated in the above described manner, by adding the ratio of the degrees of membership of the inputted pattern shown in FIG. 7(a) and the ideal shape shown in FIG. 7(c) and the ratio of the mean degrees of membership of the same and dividing the sum by 2:

$$\left( \frac{30}{38} + \frac{0.81}{0.95} \right) \div 2 = 0.82$$

It is determined that an inputted pattern matches a particular template or shape when the certainty factor exceeds a certain threshold value. When an inputted pattern is compared with a plurality of templates, the template presenting the highest certainty factor is selected if the inputted pattern is found to exceed the threshold for a plurality of templates (such as O and Q or G and C).

Figure 8:
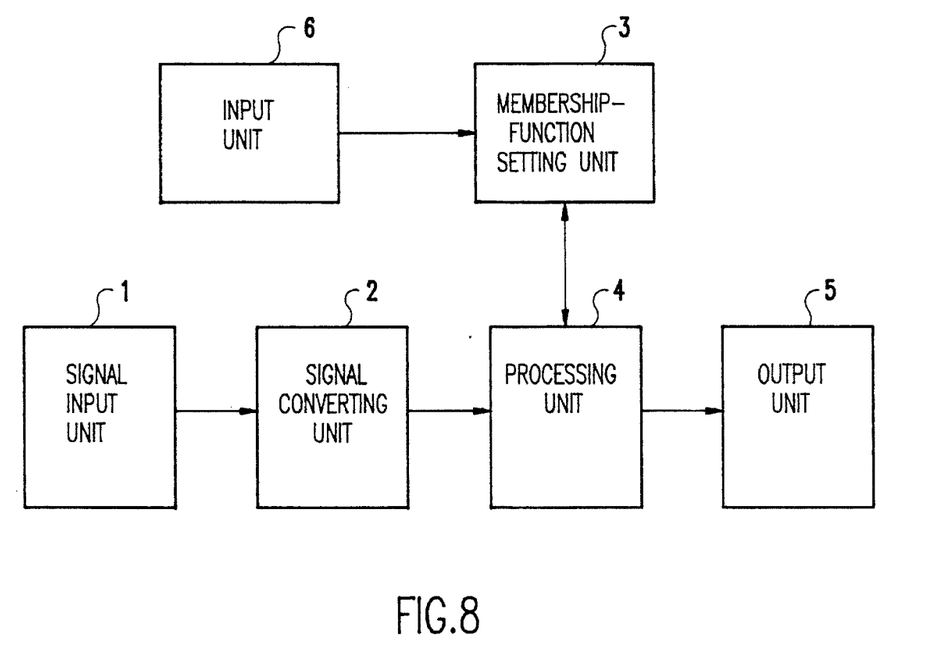
FIG. 8 is a block diagram illustrating a basic configuration of a pattern recognition apparatus according to the invention.

FIG. 8 shows a block diagram of a basic configuration of a fuzzy pattern recognition apparatus which is principally composed of an image signal input unit 1 for inputting signals representing an image to recognized such as a scanner and a CCD imager, a signal converting unit 2 for converting the inputted image signal to a binary signal corresponding to the inputted image, a membership function setting unit 3 for setting one or more three-dimensional membership functions for defining a fuzzy set for the image recognition and storing information as a vaguely defined training pattern by combining the degrees of the set three-dimensional membership functions, a processing unit 4 for calculating a certainty factor as an evaluation value of a pattern to be recognized by comparing the binary signal delivered from the signal converting unit 2 with a pattern signal delivered from the membership function setting unit 3 and a recognition result output unit 5 for outputting the recognition result derived from the processing unit 4 to a display or a printer.

Image signal input unit 1 comprises a light source for generating a light for scanning an objective image to be recognized and a photoelectric converter such as a CCD for converting an optical signal representative of the image read by the light to an electric signal.

Signal converting unit 2 comprises an analog-to-digital (A/D) converter for converting an image signal delivered from the image signal input unit 1 thereto to a binary signal having, for example, "0" and "1" values and a correcting circuit for rescaling the size of an inputted image. More specifically, an inputted image may be too large or too small to be fit in the recognizing area, in which case the image is appropriately rescaled for recognition. This may be done in a number of ways such as by sensing the boundaries of the pattern to be recognized during an initial scan of the pattern, adding margins of preselected dimensions and setting the sampling rate during a subsequent scan of the total area, including pattern margins, to articulate the scanning pattern in a matrix fashion having a predetermined number of cellules in each of two orthogonal directions. It should be noted that this size adjustment may be made independently of other manipulations of the membership function, as will be discussed below, and can be done independently for each membership function which is combined to assemble a membership function for the pattern to be recognized. Therefore, as will be evident to those skilled in the art, this size adjustment at the point of scanning the pattern to be recognized allows not only for variations in the size of the pattern but also variations in the aspect ratio of both the pattern and the individual pattern primitive shapes (e.g. character strokes) within the pattern.

Membership function generating unit 3, later described in detail, sets at least one three-dimensional membership function required for recognizing an inputted image through an input means 6 connected thereto and stores the set membership function and other information related thereto in a memory provided therein.

Input means 6 may be a keyboard or other input means for a terminal of the system through which the operator adjusts or modifies a pattern to be recognized.

Processing unit 4 comprises a programmed CPU for supervising and coordinating the operation of the above-mentioned elements. Output unit 5 receives the output of processing unit 4, compares the certainty factors for the recognition results for various templates used in the recognition process and provides an output based on the template yielding the highest certainty factor.

Figure 9:
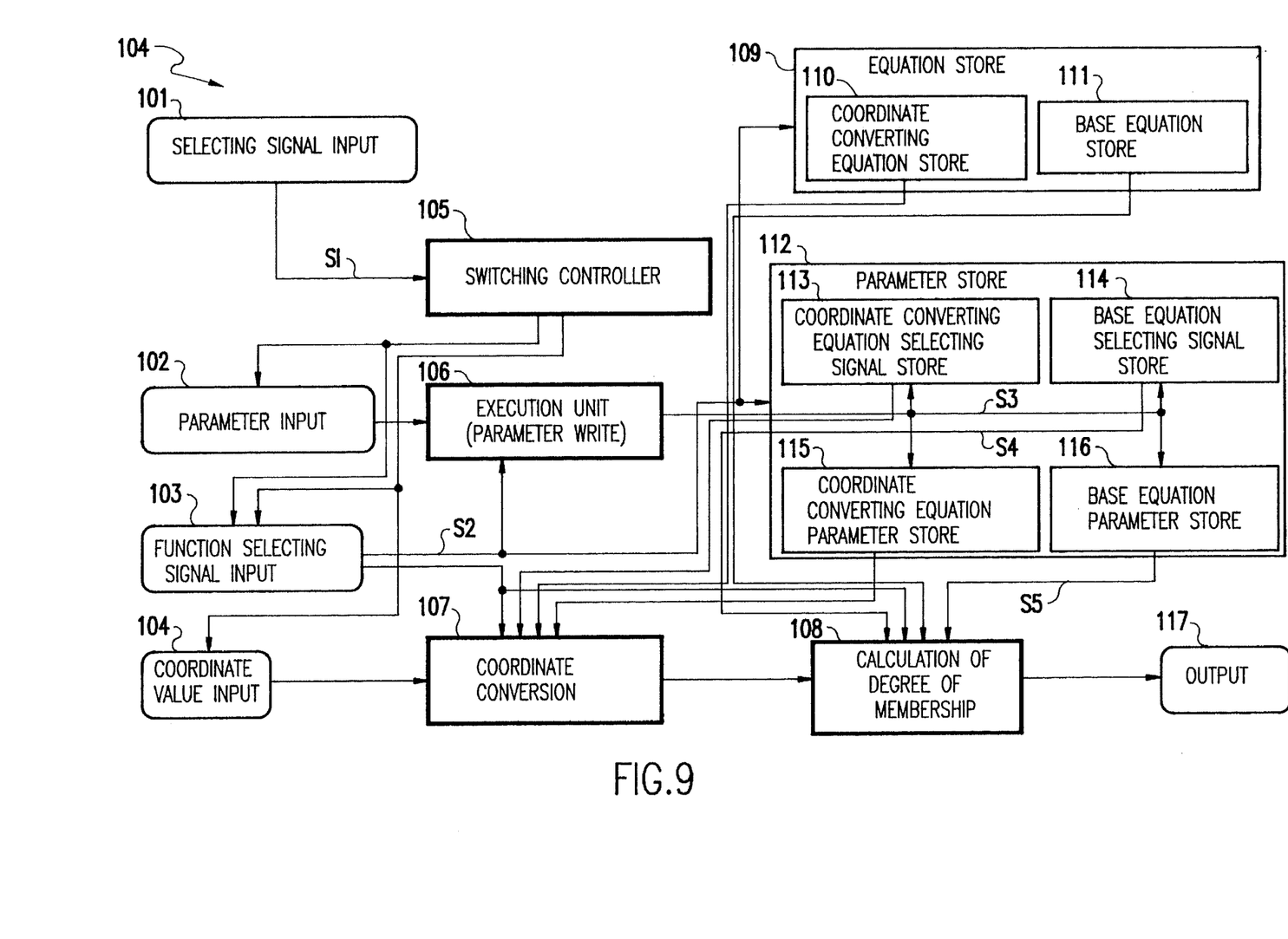
FIG. 9 is a detailed block diagram illustrating a multi-dimensional membership function generating unit employed in the invention.

FIG. 9 illustrates in more detail the membership function generating unit. In FIG. 9, a signal S1 for switching between calculation of the degree of membership and writing of set parameters is fed through an input 101 for selecting a function as the operation of the multi-dimensional membership function generator. An input 102 for inputting a parameter for setting a multi-dimensional membership function is provided for feeding specific numerical values for parameters for setting the multi-dimensional membership function, when the writing of set parameters is selected by signal S1. For example, such parameters might include coordinates of a reference point of each membership function corresponding to a primitive of the pattern such as the center of an elliptic membership function if it is desired to represent a linear character stroke with an ellipse or the center of an elliptical closed curve membership function such as that shown in FIG. 1. Similarly, a degree of rotation or other coordinate transformation (such as skewing for italics) for each membership function or the group of membership functions may be specified but is generally not required.

Either the location or the rotation of a membership function corresponding to a pattern primitive could be optimized by an evaluation function in accordance with the process described in the above incorporated disclosure could also be done, if desired.

It should be noted, as discussed above, that all input patterns will have been adjusted in size to correspond to the sizes of pattern primitives represented by individual membership functions. Therefore, by providing for the independent positioning (e.g. location and rotation) of membership functions by input parameters, the number of such membership functions which must be stored may be minimized.

An input 103 for inputting a multi-dimensional membership function selecting signal S2 is provided for feeding a signal for selecting any objective one from equations and parameters held in a multi-dimensional membership function store 109 and a multi-dimensional membership function setting parameter store 112, later referred to, upon executing both calculation of degree of membership and writing of set parameters. A coordinate value signal input 104 is provided for feeding coordinate values of a point in a space where a multi-dimensional membership function exists at which the degree of membership is to be calculated, when the degree of membership has been selected by signal S1. The above-mentioned inputs 102–104 are controlled by a switching controller 105 in accordance with a selected function, that is, the calculation of the degree of membership or writing of set parameters. Specifically, inputs 103, 104 are made effective when the calculation of degree of membership is selected, and otherwise inputs 102, 103 are made effective. An execution unit 106 writes specific parameter values fed through input 102 associated with a multi-dimensional membership function selected by input 103 into store 112. A coordinate converting unit 107 carries out functions corresponding to move and rotation transformations of a multi-dimensional membership function upon calculating the degree of membership. Specifically, unit 107 employs one of coordinate converting equations held in store 110 and a set of parameter values for coordinate converting equations held in store 115 to perform a coordinate converting calculation for coordinate values fed through input 104. In this event, when signal S2 is fed through input 103 for selecting a multi-dimensional membership function, a coordinate converting equation selecting signal S3 and coordinate converting equation parameter values are read out of stores 113, and 115, respectively, in response to signal S3, and then a coordinate converting equation is read out of store 110 in response to signal S2. A degree of membership calculating unit 108 employs one of multi-dimensional membership functions held in store 111 and a set of parameter values of multi-dimensional membership function base equations to calculate the degree of membership for the result of a calculation performed by unit 107. In this event, when signal S2 is fed through input 103, a basic equation selecting signal S4 and basic equation parameter values S5 are read out of stores 114 and 116, respectively, and then a multi-dimensional membership function base equation is read out of store 111 in response to signal S2. Store 109 holds equations associated with the multi-dimensional membership functions and is composed of an area 110 for holding coordinate converting equations for move, rotation and transformation of the multi-dimensional membership function and an area 111 for holding basic equations for calculating the degree of membership for the multi-dimensional membership function. Store 112 holds specific types and parameter values of the multi-dimensional membership functions and is composed of an area 113 for holding a signal for selecting which of coordinate converting equations held in store 110 a multi-dimensional membership function corresponding to signal S2 fed through input 103 is to utilize, an area 114 for holding a signal for selecting which of basic converting equations held in store 111 a multi-dimensional membership function corresponding to signal S2 is to utilize, an area 115 for holding specific parameter values, for example, the coordinates of the center of an elliptic membership function, of a coordinate converting equation utilized by a multi-dimensional membership function corresponding to signal S2, and an area 116 for holding specific values, for example fuzzy entropy of an elliptic membership function, of a multi-dimensional membership function base equation utilized by a multi-dimensional membership function corresponding to signal S2. The result of calculation performed by unit 108 is delivered to an output 117 for outputting a degree of membership.

Figure 10:
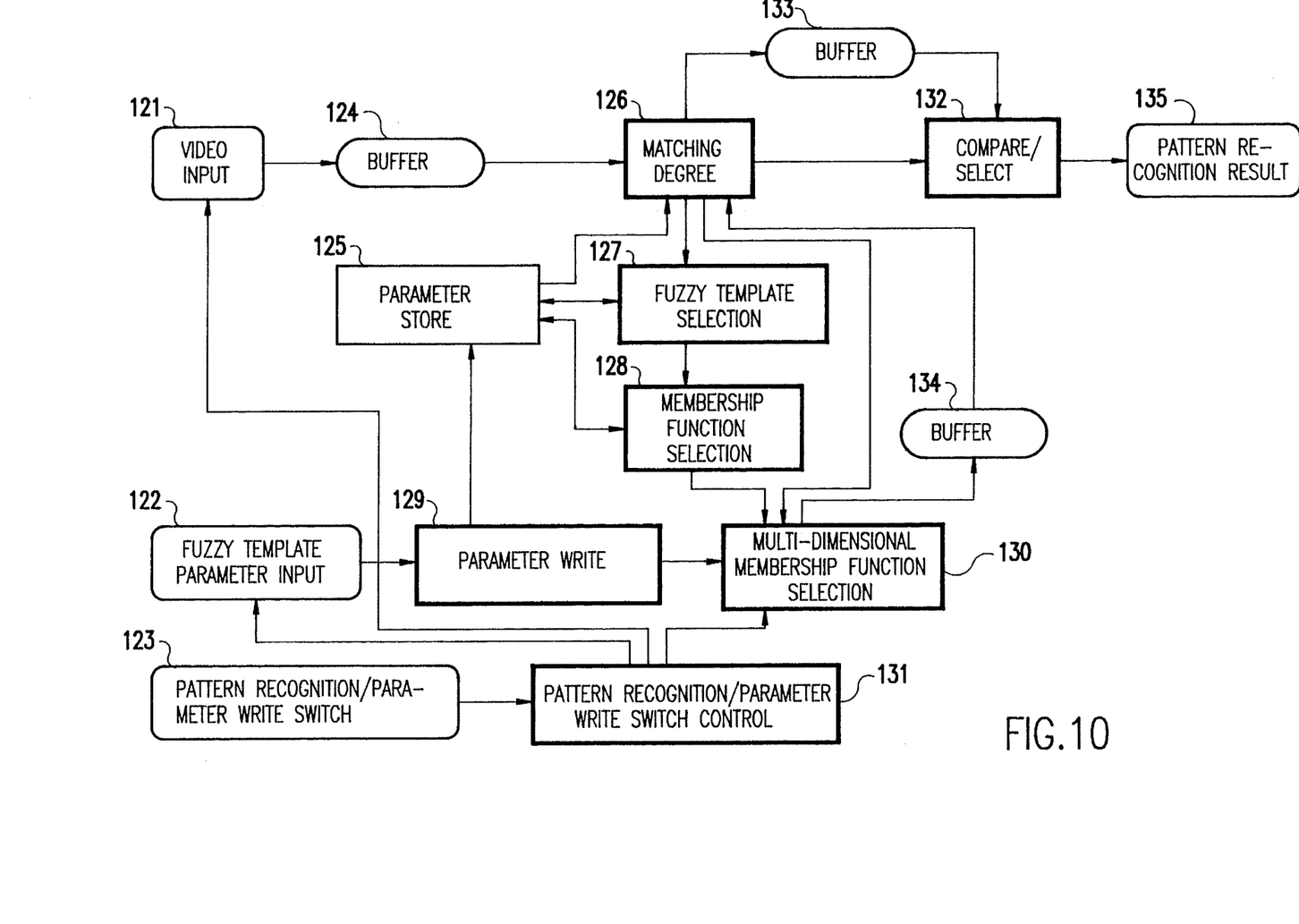
FIG. 10 is a block diagram concretely illustrating the configuration of a pattern recognition apparatus of the invention.

FIG. 10 illustrates the fuzzy pattern recognition apparatus of FIG. 8 in more detail. Video data representing a pattern to be recognized is fed from a video data input 121 when a pattern recognition is instructed by a switch 123 for changing over a pattern recognition function and a parameter write function by means of pattern recognition/parameter write switch control 131. The video data from the input 121 is temporally stored in a buffer 124. Fuzzy template setting parameters, for example, the coordinates of the center of an elliptic membership function, are fed from a parameter input 122 also under control of pattern recognition/parameter write switch control 131 and delivered to a parameter write unit 129 which writes descriptions on the structure of the multi-dimensional membership functions fed from the input 122 and multi-dimensional membership function signals into a parameter and equation store 125 corresponding to stores 109 of FIG. 9. The parameter write unit 129 also supplies a multi-dimensional membership function generating unit 130, including equation store 112 of FIG. 9, in the above described configuration with specific parameter values for setting multi-dimensional membership functions.

A matching degree calculating unit 126 is coupled to receive the pattern to be recognized stored in the buffer 134 and the fuzzy template stored in the parameter store 125 for matching both: In this event, signals representing coordinates values corresponding to the pattern to be recognized is delivered to the multi-dimensional membership function generating unit 130 through a fuzzy template selecting unit 127 and a membership function selecting unit 128. The fuzzy template selecting unit 127 selects a fuzzy template from the parameter store 125 in accordance with the resultant matching degree calculated by the unit 126, reads information on the structure of membership functions constituting the selected template from the parameter store 25 and supplies the same to the multi-dimensional membership function generating unit 130 via membership function selecting unit 128 which selects membership functions corresponding to the primitives of the template or pattern. The membership function selecting unit 128 reads multi-dimensional membership functions from the parameter unit 125 in accordance with fuzzy template information delivered from the selecting unit 127 to be supplied to the unit 130. A switching unit 131 switches modes between a pattern recognition mode and a set parameter write mode in response to the switch 123. Degrees of membership for respective video data of each cellule calculated by the unit 130 are supplied to the matching degree calculating unit 126 through a buffer 134. The matching degree corresponding to each fuzzy template pattern having indefinite boundaries is stored in buffer 133. When the calculation of matching degree of all fuzzy templates compared to the input pattern (which could be less than the number of fuzzy templates available), compare/select means 132 compares the matching degrees stored in buffer 132 and provides selected fuzzy template identification, corresponding to the greatest matching degree, to output means 135.

As described above, the present invention provides a highly reliable pattern recognition method and apparatus using a fuzzy template composed of one or more three-dimensional membership functions. It should be appreciated that the apparatus of the invention can recognize not only standard typewritten characters but also handwritten characters and various styles of fonts without the necessity of learning, formation of rules, and complicated algorithm for extracting characteristics of patterns which have been required in conventional pattern recognition apparatus.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. Pattern recognition apparatus comprising means for inputting and storing parameters representing one or more primitive shapes of a pattern to be recognized, said pattern having an identity and a membership function, means for detecting elements of a pattern to be recognized and including means for inputting binary signals representing said detected elements to said pattern recognition apparatus, means for assigning and accumulating degrees of membership of said binary signals in dependence on a multi-dimensional membership function, said multi-dimensional membership function being without boundaries in accordance with said membership function stored by said means for inputting and storing parameters and located in accordance with said one or more primitive shapes, means for developing a certainty factor for recognition of a pattern based on degree of membership in at least one pattern represented by said one or more primitive shapes in accordance with said multi-dimensional membership function, means for comparing certainty factors corresponding to degrees of membership of a pattern to be recognized with at least two patterns each represented by one or more of said primitive shapes, and means for assigning said identity of said pattern represented by said one or more primitive shapes to said pattern to be recognized, based on said certainty factor, including means for selecting an identity of one of said at least two patterns yielding highest certainty factor.

2. A pattern recognition apparatus as recited in claim 1, wherein said means for assigning and accumulating degrees of membership of said binary signals is based on a membership function.

3. A pattern recognition apparatus as recited in claim 1, wherein said means for assigning and accumulating degrees of membership of said binary signals in dependence on a membership function comprises means for determining a distance between a location of at least one said element detected by said detecting means and at least one primitive shape represented by said pattern.

4. A pattern recognition apparatus as recited in claim 3, further including means for determining a distance between a location of at least one said element in an ideal pattern corresponding to said identity of said pattern representing said at least one primitive shape and at least one primitive shape represented by said pattern and wherein said means for developing a certainty factor Includes means for comparing degrees of membership of said pattern to be recognized and said ideal pattern.

5. A pattern recognition apparatus as recited in claim 3, further including means for determining a mean degree of membership of elements of said pattern to be recognized and said ideal pattern, and wherein said means for developing a certainty factor Includes means for comparing means degree of membership and degrees of membership of said pattern to be recognized and said ideal pattern.

* * * * *